United States Patent [19]
Hayashi et al.

[11] Patent Number: 4,708,633
[45] Date of Patent: Nov. 24, 1987

[54] INJECTION MOLDING MACHINE

[75] Inventors: Keizo Hayashi, Nagoya; Hitoshi Hasegawa, Ichinomiya; Katsuhiro Suhara, Inazawa, all of Japan

[73] Assignee: Toyoda Gosei Co., Ltd., Nishikasugai, Japan

[21] Appl. No.: 813,935

[22] Filed: Dec. 27, 1985

[30] Foreign Application Priority Data

Dec. 29, 1984 [JP] Japan ................................. 59-278160

[51] Int. Cl.$^4$ ............................................. B29C 45/04
[52] U.S. Cl. ............................... 425/574; 264/328.11; 425/451; 425/451.7; 425/451.9; 425/557; 425/559; 425/575; 425/581; 425/595
[58] Field of Search ............... 425/557, 559, 574, 575, 425/581, 586, 595, 451, 451.7, 451.9, 150, 190, 192 R, 193, 195, 157, 159, 588, 589; 264/328.1, 328.7, 328.11

[56] References Cited

U.S. PATENT DOCUMENTS 4,497,621 2/1985 Kudert et al. ...................... 425/564
4,608,005 8/1986 Hayashi et al. ................. 425/192 R

FOREIGN PATENT DOCUMENTS 3222828 4/1984 Fed. Rep. of Germany .
1228490 4/1960 France .

Primary Examiner—Jay H. Woo
Assistant Examiner—Timothy W. Heitbrink
Attorney, Agent, or Firm—Cushman, Darby & Cushman

[57] ABSTRACT

An injection molding machine for molding with a high polymer material such as rubber and resin which is improved in the working efficiency and productivity thereof. The injection molding machine comprises a plurality of independent metallic molds, a metallic mold securing device having two receiving portions for receiving and clamping the metallic molds therein, a metallic mold loading and unloading device for loading and unloading the metallic molds to and from the receiving portions, and a drive device for moving the metallic mold securing device. Accordingly, injection and vulcanization can be carried out alternately for two metallic molds so that, also during vulcanization for the first metallic mold, injection to the cavity of the second metallic mold can be carried out. The metallic mold securing device can otherwise have more than two such receiving portions when necessary.

10 Claims, 8 Drawing Figures

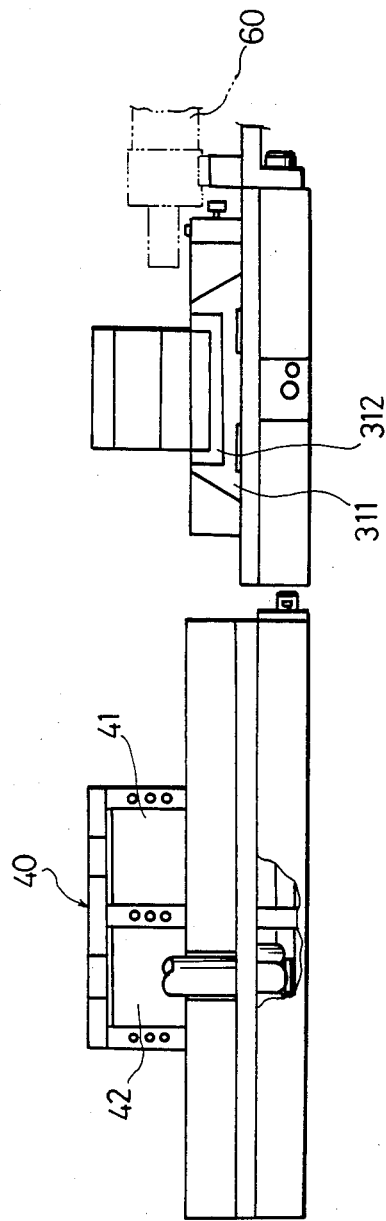

INJECTION MOLDING MACHINE

BACKGROUND OF THE INVENTION

1. Field of the Invention

This invention relates to an injection molding machine of the type wherein injection, vulcanization and cooling are effected by turns for a plurality of metallic molds.

2. Description of the Prior Art

Conventional injection molding machines are constituted from a single injection section which plasticizes and injects resin, rubber or like materials, and a single metallic mold section which takes in the material injected from the injection section. Accordingly, if much time is taken for cooling of resin or for vulcanization of rubber within the metallic mold section, the injection section only waits meantime, resulting in a low utilization efficiency of the injection section.

SUMMARY OF THE INVENTION

It is an object of the present invention to provide an injection molding machine which is improved in the operation ratio of an injection section thereof to improve the productivity of the entire injection molding machine by providing the injection molding machine with a plurality of metallic mold sections instead of a single metallic mold section.

According to the invention, there is provided an injection molding machine comprising a plurality of independent metallic molds, a metallic mold securing device having at least two receiving portions for receiving and clamping the metallic molds therein, a base mounting the metallic mold securing device for sliding movement thereon, a drive device for moving the metallic mold securing device on the base, a metallic mold loading and unloading device for loading and unloading the metallic molds to and from the metallic mold securing device, an injection device for injecting plasticized material into the metallic molds, and a control device for controlling the drive device, the metallic mold loading and unloading device, and the injection device.

The metallic molds may be of the same type with a plastic mold, a rubber mold and the like which are used in ordinary injection molding machines. In particular, the metallic molds are of the separated type which has a cavity in the interior thereof and has one or more pouring openings through which material is supplied from the injection device. The metallic molds may otherwise be of the type which has a path for material such as a runner. The metallic molds may alternatively be of the type which has a cooling device or a heating device therein. The number of the metallic molds may be two or more and can be determined in connection with times required for cooling, vulcanization and unloading of a molded article.

The metallic mold securing device has at least two receiving portions for receiving and clamping metallic molds therein. The receiving portions must necessarily urge the separated mold members in a direction to close them to each other. The receiving portion is preferably formed as a framework which receives the metallic mold therein and holds it from opening. Particularly, the receiving portion may preferably have such a shape that the ceiling thereof gradually descends toward the interior thereof so that the metallic mold received is mechanically clamped between the ceiling and the floor. Further, the metallic mold securing device preferably includes a heating device or a cooling device for heating or cooling a metallic mold secured thereto. The number of the receiving portions of the metallic mold securing device can be determined arbitrarily and may be two, three or more.

The base mounts the metallic mold securing device for sliding movement thereon. The base preferably includes a guide rail, a groove or the like provided thereon for assuring the direction and passage of movement of the metallic mold securing device.

The drive device moves the metallic mold securing device on the base in order to move a metallic mold between the injection position and the loading and unloading position.

The injection device plasticizes rubber or plastic material and supplied it in a predetermined quantity into the cavity of a metallic mold received in any of the receiving portions of the metallic mold securing device. The injection device is normally located at a fixed position of the base.

The metallic mold loading and unloading device acts as means for inserting and removing a metallic mold into and from the metallic mold securing device. Also, the metallic mold loading and unloading device is normally located at a fixed position of the base. The metallic mold loading and unloading device may include a device for opening and closing a metallic mold.

The control device controls the injection device, the drive device and the metallic mold loading and unloading device. The control device may include various sensors, electric device and/or hydraulic device and sequentially controls motions of the device specified above. Logic circuits or the like constituted from sequencers, microcomputers, and/or relays can be used for the control device in order to control motions of the specified devices. The control device may preferably include sensors of various types.

In the injection molding machine, a required metallic mold is received in and clamped by one of the receiving portions of the metallic mold securing device by the metallic mold loading and unloading device under control of the control device. Then, the drive device is operated to move the metallic mold securing device on the base to move the metallic mold received in the receiving portion to the injecting position. Then, the injection device is operated to inject material into the cavity of the metallic mold. The metallic mold securing device endures an injecting pressure and maintains the mold clamping condition thereof without allowing the metallic mold to open. Either simultaneously with or before or after such injection, another metallic mold is put into another one of the receiving portions. After that, material is injected into the cavity of the second metallic mold. Meanwhile, the material which was injected into the first metallic mold is cooled or vulcanized into a solid condition. It is to be noted that where the time required for such solidification is long, either a further metallic mold may be put into a further receiving portion or material may be injected into a further metallic mold during such an interval of time. The metallic mold after the material has been solidified sufficiently is taken out of the receiving portion of the metallic mold securing device by the metallic mold loading and unloading device. Then, a molded article is taken out either by an operator or molded article taking out device from within the cavity of the receiving portion of the metallic mold thus taken out. And then, the metallic mold is again put into the receiving portion of the metallic mold securing device by the metallic mold loading and unloading device.

BRIEF DESCRIPTION OF THE DRAWINGS

FIG. 4 is front elevational view showing a portion of the machine for moving the metallic mold securing device, which is one of features of the injection molding machine according to the invention;

FIG. 5 is a side elevational view of the portion of the machine of FIG. 4;

DETAILED DESCRIPTION OF THE PREFERRED EMBODIMENT

Figure 1:
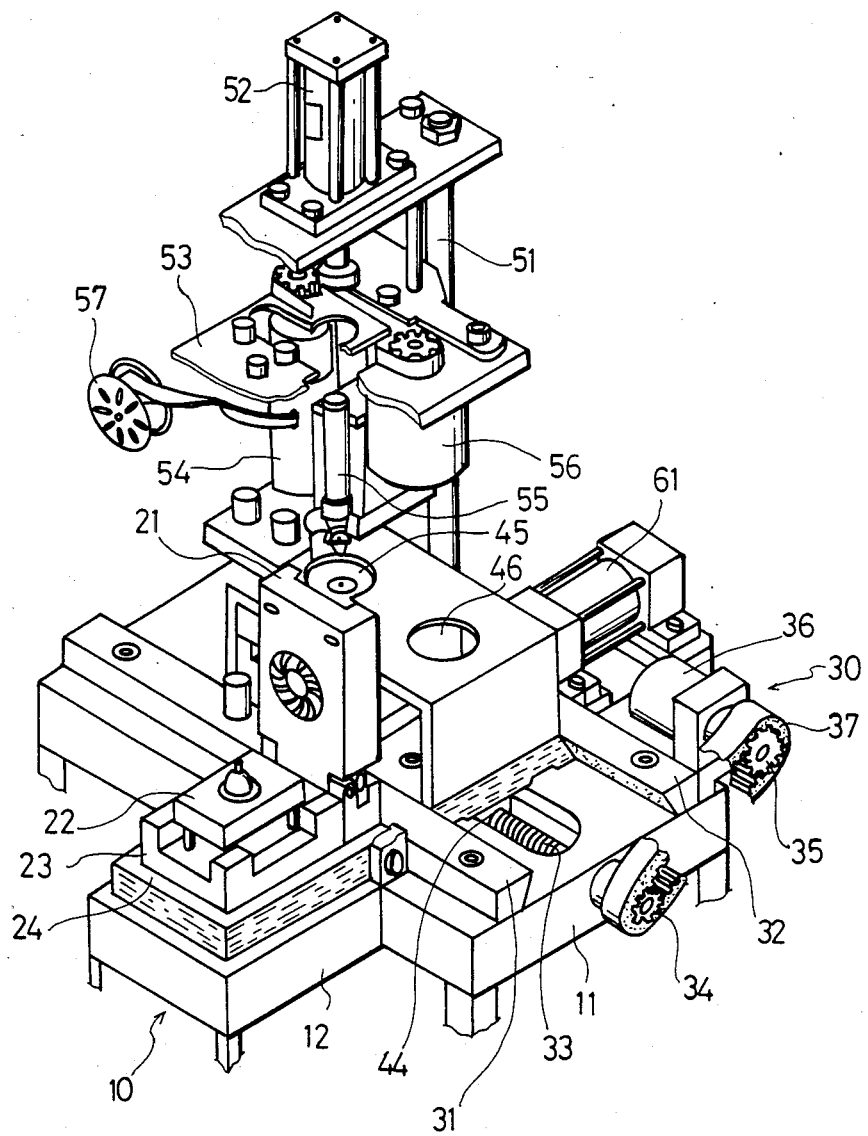
FIG. 1 is a perspective view illustrating an entire rubber injection molding machine according to a preferred embodiment of the present invention.
Figure 2:
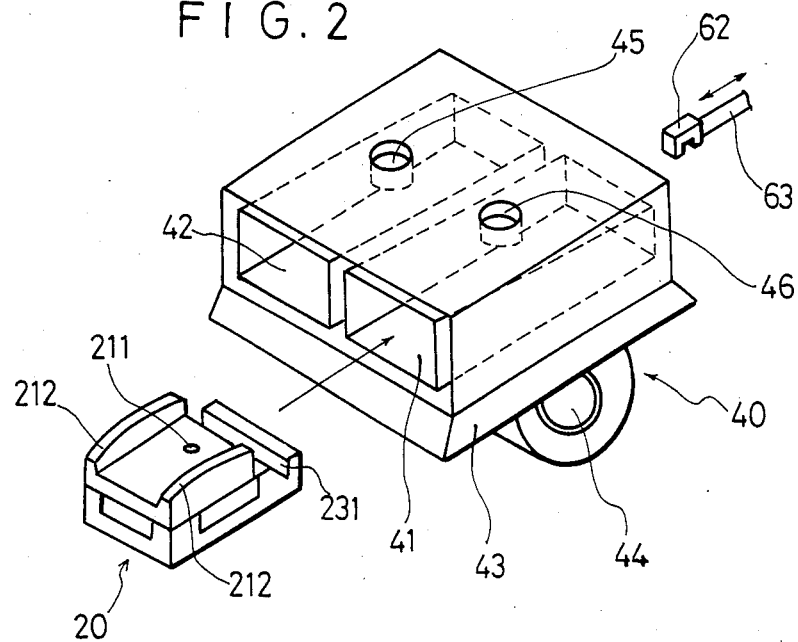
FIG. 2 is a perspective view illustrating a metallic mold which is being put into a metallic mold securing device.

Referring first to FIG. 1 which illustrates an entire rubber injection molding machine according to a preferred embodiment of the present invention, a first metallic mold is shown in a condition just before a molded article is taken out from a cavity thereof after injection and vulcanization while a second metallic mold is shown in a condition after completion of injection. Referring also to FIG. 2 which is a perspective view illustrating a metallic mold which is being put into a metallic mold securing device as well as to FIG. 3 which is an enlarged central cross sectional view of an injection device, the rubber injection molding machine includes a base 10, two metallic molds 20, a drive device 30 mounted on the base 10, a metallic mold securing device 40 connected to be driven by the drive device 30, and an injection device 50 and a metallic mold loading and unloading device 60 both mounted on the base 10.

The base 10 is in the form of a board serving as a foundation and includes a main portion 11 having a rectangular shape and a sub portion 12 mounted integrally on a side of the main portion 11.

The metallic molds 20 each include an upper die 21, a middle die 22 and a lower die 23. The middle die 22 is mounted for up and down sliding movement within the lower die 23. The upper die 21 is supported for pivotal motion on the lower die 23 and is urged in a direction to be opened by a spring not shown. The upper die 21 has a pouring hole 211 formed therein and has two slide portions 212 for mold clamping formed on an upper face thereof. The slide portions 212 are projected upwardly at central portions thereof. The lower die 23 has an engaging groove 231 formed to extend in a lateral direction at a rear portion thereof.

The metallic mold securing device 40 is in the form of a box as seen in FIG. 2 and has two receiving portions 41 and 42 extending therethrough between opposite sides thereof. The receiving portions 41 and 42 have a height which decreases from the entrance toward the interior. Accordingly, as a metallic mold 20 is inserted into the receiving portion 41 or 42, it is clamped between the ceiling and the floor of the receiving portion. The metallic mold securing device 40 has a pair of through-holes 45 and 46 formed at central portions of the ceiling thereof and includes a downwardly expanded guide portion 43 made of a heat insulating material and mounted on the underside thereof. The metallic mold securing device 40 further includes a nut portion 44 mounted on the underside of the guide portion 43 and constituting a component of the drive device 30.

The drive device 30 includes a pair of guide bars 31 and 32 secured at the top of the main portion 11 of the base 10, a spindle 33 mounted for rotation in the main portion 11, a driven gear 34, a drive motor 36 secured to the main portion 11 and having a drive gear 35 thereon, and a toothed belt 37 extending between the driven gear 34 and the drive gear 35. The drive device 30 operates such that the drive motor 36 is rotated to rotate the spindle 33 thereby to move the metallic mold securing device 40 along the guide bars 31 and 32 via the nut portion 44.

Figure 3:
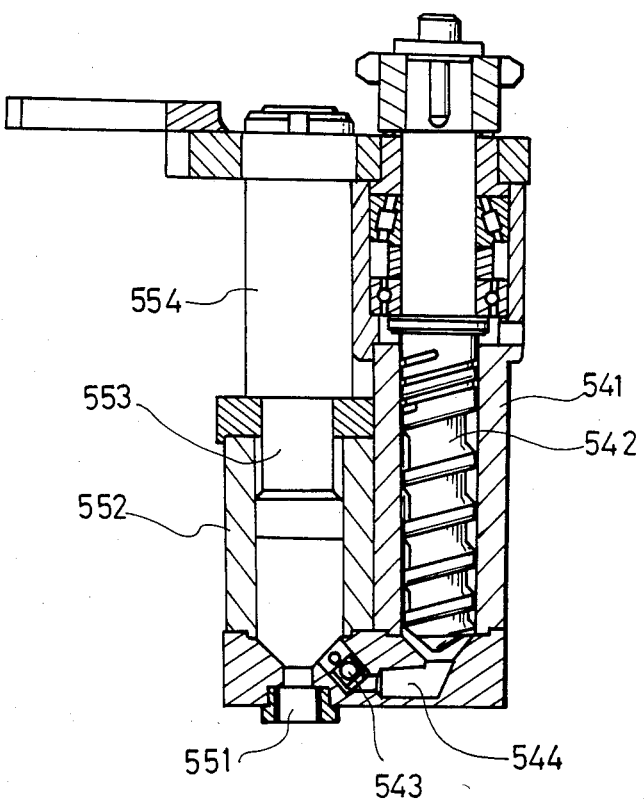
FIG. 3 is an enlarged central cross sectional view of an injection apparatus.

The injection device 50 may be an ordinary rubber injection machine and includes a moving cylinder 52 mounted on the main portion of the base 10 by means of a support post 51 and extending downwardly, a platform 53 connected to be moved by the moving cylinder 52, a plasticizing section 54, an injecting section 55 and a motor 56 all secured to the platform 53, and a rotary cassette 57 for supplying rubber material therefrom. The plasticizing section 54 has a cross section as shown in FIG. 3 and includes a plasticizing cylinder 541 and a mandrel 542. The mandrel 542 is moved by the motor 56. The injecting section 55 includes an injecting cylinder 552 having an injection nozzle 551 therein, an injecting piston 553, and a hydraulic cylinder 554. The plasticizing cylinder 541 and the injecting cylinder 552 are connected to each other by way of a communicating path 544 having a pair of check valves 543 at opposite ends thereof. As the moving cylinder 52 is moved, the injection nozzle 551 of the injecting section 55 passes the through-hole 45 or 46 of the metallic mold securing device 40 and is brought into register with pouring hole 211 of a metallic mold 20 held in the receiving portion 41 or 42.

The metallic mold loading and unloading device 60 includes, as major components, a hydraulic cylinder 61, and a piston 63 having a hook 62 at an end thereof. The hydraulic cylinder 61 is secured to a side of the main portion 11 of the base 10 opposite to the sub portion 12. The piston 63 can be moved to extend through either of the receiving portions 41 and 42 and outwardly to a position above the sub portion 12. A heat insulating working plate 64 for receiving a metallic mold 20 for sliding movement thereon is secured to an upper face of the sub portion 12 of the base 10.

A control device is provided, including an input interface, a microcomputer and an output interface, all not shown.

FIG. 4 and 5 are a front elevational view and a side elevational view, respectively, of an arrangement for moving the metallic mold securing device 40, which is one of features of the injection molding machine according to the present invention. Reference numerals in these figures correspond to those in FIGS. 1 to 3.

Figure 6:
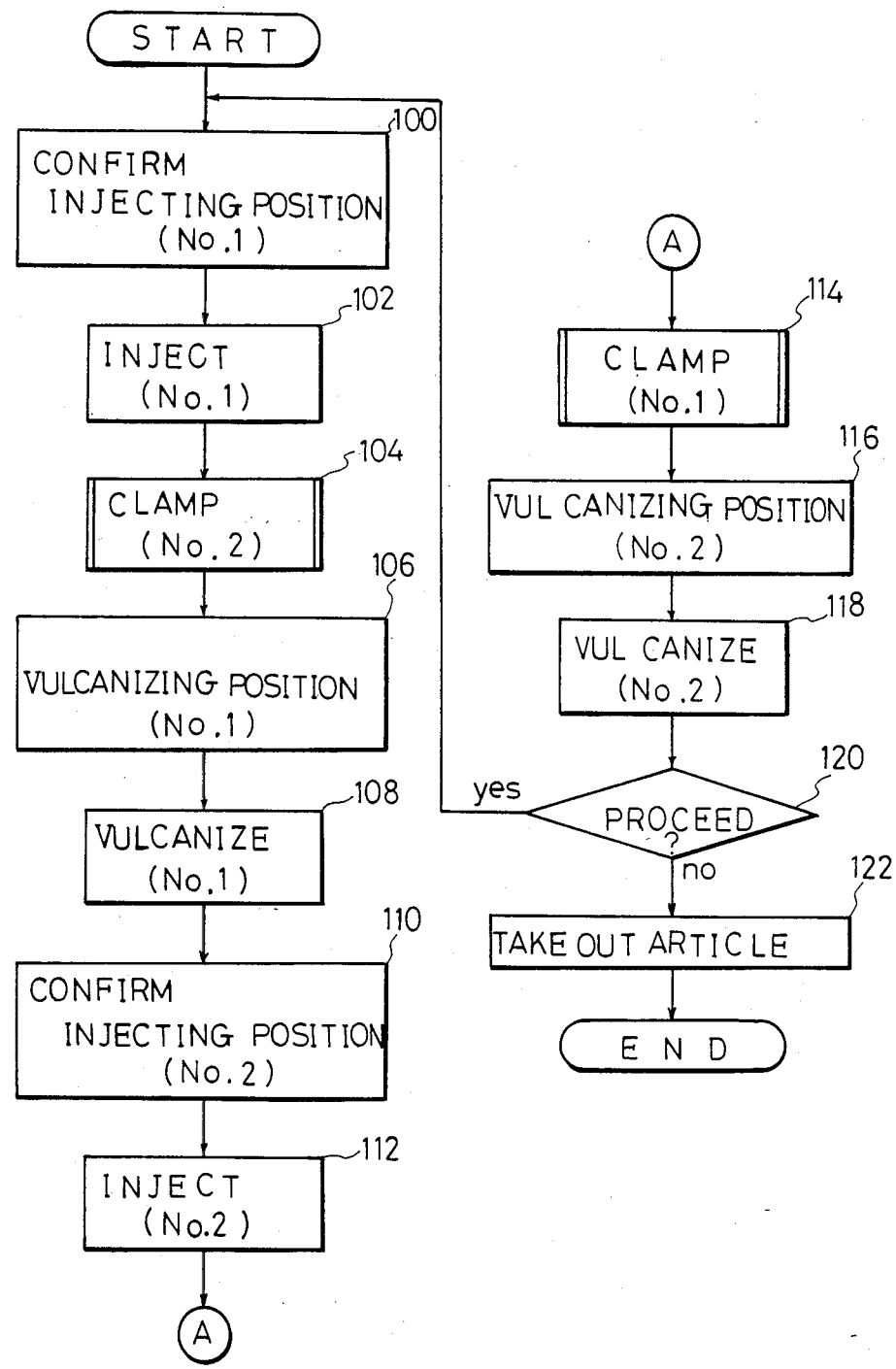
FIGS. 6 and 7 are flow charts illustrating processes of a computer.
Figure 8:
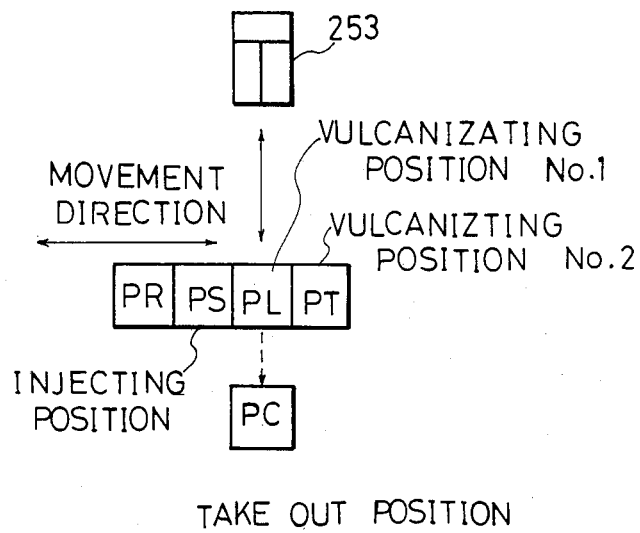
FIG. 8 is a diagrammatic representation illustrating stopping positions of the metallic mold employed in the injection molding machine according to the embodiment of the invention.

Referring now to FIG. 8 which illustrates stopping positions of a metallic mold, reference symbol PS is a position at which injection into a cavity is effected, PT a position at which an article is vulcanized, PL a position at which an article is vulcanized and a metallic mold is loaded and unloaded, and PC a position at which an article is removed. Referring now to FIG. 6, expressions No. 1 and No. 2 each indicate that a designated operation is done for a first or second metallic mold at a specified step.

Now, operation of the embodiment when carrying out injection molding of rubber will be described with reference to flow charts of FIGS. 6 and 7 which illustrate a process of the computer.

The computer starts its operation from step 100 in response to depression of a start button on an operation board by an operator. In the present embodiment, it is assumed that first and second metallic models are initially at the positions PS and PC, respectively.

At step 100, it is determined if the first metallic plate (No. 1) is at the position PS or not, and then when it is not at the position PS, it is repositioned to the position PS. Then at step 102, injection to the first metallic mold is carried out until completion of such injection is confirmed.

Figure 7:
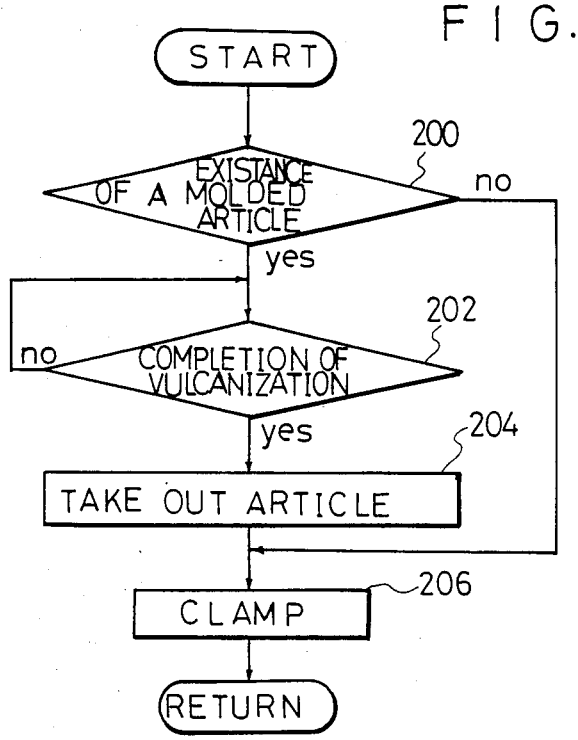

At a following step 104, the second metallic mold (No. 2) to which injection has not been carried out is clamped, and such mold clamping is carried out by way of a subroutine as illustrated in FIG. 7. Referring now to the flow chart of FIG. 7, it is determined, at step 200, if there is a molded article present in the cavity or not, and then when there is a molded article in the cavity, it is determined, a step 202, if the temperature of the molded article is raised to a predetermined level or not. Then at step 204, the article is taken out of the cavity, and at step 206, the metallic mold at the position PC is drawn to the position PL by the mold clamping cylinder 253 to effect mold clamping. After then, control returns to the main program.

Thus, after application of a predetermined pressure to the plasticized rubber filled in the cavity by completion of injection, the first metallic mold is moved to the vulcanizing position PL at step 106, and then at step 108, the heater is rendered operative for vulcanization of the rubber.

At following steps 110 though 118, similar operations to those for the first metallic mold are carried out for the second metallic mold.

Step 120 is provided for determining whether injection molding is to proceed further or not, and where a cycle stopping button of the control device has not been depressed, control jumps to step 100, but otherwise where the cycle stopping button has been depressed, an article is taken out of the second metallic mold at a following step 122, whereafter the program comes to an end.

According to the present embodiment, the metallic mold moving device is automatically controlled to stop a metallic mold at the four stopping positions PR, PS, PL and PT, and mold clamping is automatically controlled to be effected by the cylinder 253. As a result, injection to the second metallic mold (No. 2) can be carried out during a vulcanizing process for the first metallic mold (No. 1), and hence injecting and vulcanizing processes can be carried out alternately for the first and second metallic molds. Accordingly, such a condition that a molding cycle of an injection molding machine apparently stops during vulcanization as in a conventional injection molding machine can be eliminated, and hence the productivity of an injection molding machine can be substantially doubled.

As apparent from the foregoing description, according to the present invention, a resin injection molding machine includes a plurality of independent metallic molds, a metallic mold securing device for receiving and clamping the plurality of metallic molds, a metallic mold loading and unloading device for loading and unloading the metallic molds to and from receiving portions of the metallic mold securing device, and a drive device for moving the metallic mold securing device. Accordingly, injection and vulcanization can be carried out alternately for two metallic molds as described above, and hence, also during vulcanization for the first one of the metallic molds, injection to the cavity of the second metallic mold can be carried out. As a result, the productivity of an injection molding machine for high polymer materials such as rubber, resin and the like can be raised, and the working efficiency of an injection molding machine can be improved.

What is claimed is:

1. An injection molding machine, comprising:
    a plurality of independent metallic molds;
    a metallic mold securing device having at least two receiving portions for receiving and clamping said metallic molds therein;
    a base mounting said metallic mold securing device for sliding movement thereon;
    a drive device for moving said metallic mold securing device on said base;
    a metallic mold loading and unloading device for loading and unloading said metallic molds to and from said metallic mold securing device;
    an injection device for injecting plasitcized material into said metallic molds; and
    a control device for controlling said drive device, said metallic mold loading and unloading device, and said injection device.

2. An injection molding machine according to claim 1, wherein each of said metallic molds is of a separable-element type by including two elements which are pivotally connected by each other and urged in a direction to open from each other, and wherein each of said receiving portions of said metallic mold securing device urges the metallic mold received therein in a closed position.

3. An injection molding machine according to claim 2, wherein each of said receiving portions of said metallic mold securing device is in the form of a framework which receives and holds a metallic mold from opening therein.

4. An injection molding machine according to claim 2, wherein each of said receiving portions of said metallic mold securing device has such a shape that a ceiling thereof gradually descends towards a floor thereof in the interior thereof so that a respective said metallic mold when received therein is mechanically clamped between said ceiling and said floor.

5. An injection molding machine according to claim 1, wherein there are two said metallic molds and two said receiving portions of said metallic mold securing device, and wherein said two metallic molds are alternately moved between a first position at which said plasticized material is injected into a respective said metallic mold and a second position at which said plasticized material is vulcanized in a respective said mold.

6. An injection molding machine, comprising:
    a base having a horizontal bed;
    a mold securing device having two laterally-adjacent mold-receiving portions, namely a first and a second mold-receiving portion, each of which opens both forwardly and rearwardly and has a floor and a roof which slope towards one another rearwardly of the respective said portion;

station defining means defining for laterally adjoining stations on said base, a first, a second, a third and a fourth station;

said mold securing device being supported on said base for movement therealong for selectively alternatively placing:
(a) said first mold-receiving portion in said third station and said second mold-receiving portion in said fourth station;
(b) said first mold-receiving portion in said second station and said second mold-receiving portion in said third station;
(c) said first mold-receiving portion in said first station and said second mold-receiving portion in said second station;

a pair of molds, each having a lower portion and an upper portion, said upper and lower mold portions of each mold defining between them a respective mold cavity, each said mold further including means permitting the respective upper mold portion to be moved towards and away from the respective lower mold portion for closing and opening the respective mold cavity when such mold is not received in a respective mold-receiving portion, each mold further including inlet means through which the mold cavity of that mold can be filled with a molding compound while that mold cavity is closed and received in a respective said mold-receiving portion;

each of said molds being adapted to be displaced at said third station into a respective said mold-receiving portion so as to be clamped closed therein by engagement between the respective said floor and the respective said roof, and to be displaced out of the respective said mold-receiving portion so as to discontinue clamping such mold closed so that such mold is free to be opened;

an extension of said bed of said base disposed forwardly of said third station;

displacing means associated with said third station for displacing a respective said mold, when said respective mold is located on said extension of said bed, rearwardly and in a closed condition into the respective said mold-receiving portion so as to be clamped closed therein, and for displacing a respective said mold, when located in a respective said mold-receiving portion, forwardly out of such mold-receiving portion and onto said extension of said bed so that the respective said mold may be opened for removal of a molded article therefrom; and injection means associated with said second station for introducing molding compound through a respective said inlet means into a respective said mold cavity while a respective said mold is disposed in said first mold-receiving portion in said second station.

7. The injection molding machine of claim 6, further including:
moving means associated with said base and with said mold securing device for moving said mold securing device along said base so as to cyclically place said first and second mold-receiving portions as aforesaid.

8. The injection molding machine of claim 6, wherein:
each of said mold receiving portions includes through-hole means which align with respective of said mold inlet means so that the respective said mold cavities may be filled with molding compound through the respective said mold inlet means while the respective said molds are alternatively located in said second station.

9. The injection molding machine of claim 8, wherein:
said injection means includes an injection cylinder having an injection nozzle which becomes aligned with the respective said through-hole means so that molding compound may be injected therethrough into the respective said mold cavity.

10. The injection molding machine of claim 7, further including:
heater means associated with the respective said mold cavities in an interval of time between when said mold cavities receive molding compound in said second station and molded articles are removed therefrom forwardly of said third stations, for curing molding compound received in such mold cavities.

* * * * *